(12) United States Patent
Fujita et al.

(10) Patent No.: US 10,761,369 B2
(45) Date of Patent: *Sep. 1, 2020

(54) DISPLAY APPARATUS

(71) Applicant: DENSO CORPORATION, Kariya, Aichi-pref. (JP)

(72) Inventors: Katsumi Fujita, Kariya (JP); Seigo Tane, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 63 days.

This patent is subject to a terminal disclaimer.

(21) Appl. No.: 15/953,542

(22) Filed: Apr. 16, 2018

(65) Prior Publication Data

US 2018/0229605 A1 Aug. 16, 2018

Related U.S. Application Data

(63) Continuation of application No. 15/323,451, filed as application No. PCT/JP2015/003195 on Jun. 25, 2015, now Pat. No. 10,040,354.

(30) Foreign Application Priority Data

Jul. 18, 2014 (JP) ................................ 2014-147405

(51) Int. Cl.
*G02F 1/13357* (2006.01)
*B60K 37/02* (2006.01)
(Continued)

(52) U.S. Cl.
CPC ........ *G02F 1/133606* (2013.01); *B60K 35/00* (2013.01); *B60K 37/02* (2013.01); *G01D 7/02* (2013.01); *G02F 1/1313* (2013.01); *G02F 1/1323* (2013.01); *G02F 1/133504* (2013.01); *G09G 3/36* (2013.01); *B60K 2370/154* (2019.05); *B60K 2370/1515* (2019.05); *B60K 2370/1534* (2019.05); *B60K 2370/20* (2019.05);
(Continued)

(58) Field of Classification Search
CPC ................. G02F 1/1313; G02F 1/1323; G02F 1/133504; G02F 1/133606; B60K 35/00; B60K 37/02; B60K 2370/52; G09G 3/36
See application file for complete search history.

(56) References Cited

U.S. PATENT DOCUMENTS 6,411,216 B1 6/2002 Fukushima et al.
6,542,146 B1 4/2003 Toffolo et al.
(Continued)

FOREIGN PATENT DOCUMENTS

CN 103748435 A 4/2014
DE 10331131 A1 1/2005
(Continued)

*Primary Examiner* — Dung T Nguyen
(74) *Attorney, Agent, or Firm* — Harness, Dickey & Pierce, P.L.C.

(57) ABSTRACT

A display apparatus includes multiple display portions each of which displays a content different from one another, a decoration member which decorates one of the multiple display portions, an actuator which moves the decoration member, and a control portion which controls the actuator to move the decoration member to a position at which the decoration member decorates one display portion selected among the multiple display portions.

11 Claims, 7 Drawing Sheets

(51) Int. Cl.

| | |
|---|---|
| *G01D 7/02* | (2006.01) |
| *G02F 1/13* | (2006.01) |
| *G02F 1/1335* | (2006.01) |
| *G09G 3/36* | (2006.01) |
| *B60K 35/00* | (2006.01) |
| *G09G 5/373* | (2006.01) |
| *G09G 3/34* | (2006.01) |

(52) U.S. Cl.
CPC ...... *B60K 2370/33* (2019.05); *B60K 2370/52* (2019.05); *B60K 2370/682* (2019.05); *B60K 2370/685* (2019.05); *B60K 2370/688* (2019.05); *B60K 2370/695* (2019.05); *B60K 2370/698* (2019.05); *G09G 3/3406* (2013.01); *G09G 5/373* (2013.01); *G09G 2340/045* (2013.01); *G09G 2380/10* (2013.01)

(56) References Cited

U.S. PATENT DOCUMENTS

| | | | |
|---|---|---|---|
| 10,040,354 B2* | 8/2018 | Fujita | ............... G01D 7/02 |
| 2006/0092098 A1 | 5/2006 | Yokota et al. | |
| 2008/0123322 A1 | 5/2008 | Tane et al. | |
| 2008/0285138 A1 | 11/2008 | Lebreton | |
| 2012/0090532 A1 | 4/2012 | Hori et al. | |
| 2012/0293534 A1 | 11/2012 | Dehmann et al. | |
| 2013/0307757 A1 | 11/2013 | Yasumoto | |
| 2013/0314891 A1* | 11/2013 | Miyazawa | ........... G01D 13/265 362/23.14 |
| 2014/0216329 A1 | 8/2014 | Masuda | |
| 2014/0233208 A1* | 8/2014 | Hamada | ................ B60K 37/02 362/23.17 |
| 2014/0253821 A1 | 9/2014 | Takatoh et al. | |
| 2015/0055098 A1 | 2/2015 | Ishibashi | |
| 2017/0253178 A1 | 9/2017 | Tane et al. | |

FOREIGN PATENT DOCUMENTS

| | | |
|---|---|---|
| JP | H08175225 A | 7/1996 |
| JP | 2000219060 A | 8/2000 |
| JP | 2003302262 A | 10/2003 |
| JP | 2004106662 A | 4/2004 |
| JP | 2004226247 A | 8/2004 |
| JP | 2006021575 A | 1/2006 |
| JP | 2008030638 A | 2/2008 |
| JP | 2008032516 A | 2/2008 |
| JP | 2008089481 A | 4/2008 |
| JP | 2009192434 A | 8/2009 |
| JP | 2010169299 A | 8/2010 |
| JP | 2010175411 A | 8/2010 |
| JP | 2010281983 A | 12/2010 |
| JP | 4637546 B2 | 2/2011 |
| JP | 2013156219 A | 8/2013 |
| JP | 2013238817 A | 11/2013 |
| JP | 2014115223 A | 6/2014 |
| KR | 2014-0078661 A | 6/2014 |
| WO | WO-2010150583 A1 | 12/2010 |

* cited by examiner

FIG. 6 <TACHOMETER MODE>

DISPLAY APPARATUS

CROSS REFERENCE TO RELATED APPLICATION

This application is a Continuation Application of U.S. patent application Ser. No. 15/323,451 filed on Jan. 3, 2017 which is a U.S. National Phase Application under 35 U.S.C. 371 of International Application No. PCT/JP2015/003195 filed on Jun. 25, 2015 and published in Japanese as WO 2016/009598 A1 on Jan. 21, 2016. These applications are based on and claims the benefit of priority from Japanese Patent Application No. 2014-147405 filed on Jul. 18, 2014. The entire disclosures of all of the above applications are incorporated herein by reference.

TECHNICAL FIELD

The present disclosure relates to a display apparatus provided with a decoration member.

BACKGROUND ART

Patent Literature 1 describes a display apparatus which displays, for example, a pointer and a scale representing a speedometer in a liquid crystal display panel. The display apparatus includes a decoration ring (decoration member) disposed closer to a user compared with the liquid display panel in a visual recognition direction. In the display apparatus, the decoration ring is disposed to be movable along a display surface of the liquid crystal display panel. Hence, when a display position of the speedometer in the liquid crystal display panel is moved, the decoration ring is also moved so as to follow the movement of the display position.

The display apparatus configured as above may display a vehicle speed by switching a display mode between a mode in which a navigation map is displayed together with the vehicle speed and a mode in which a tachometer is displayed together with the vehicle speed. When the display mode is switched, it is desirable in some cases to emphasize the tachometer or the map by attracting user's attention to the tachometer or the map. However, in the display apparatus described in Patent Literature 1, the decoration ring is moved so as to follow a display position of the speedometer. Hence, even when the display position of the decoration ring is changed due to switching of the display mode, the speedometer is always being emphasized by the decoration member as the attention-attraction target.

PRIOR ART LITERATURE

Patent Literature

[Patent Literature 1] JP 4637546 B

SUMMARY OF INVENTION

In view of the foregoing difficulties, it is an object of the present disclosure to provide a display apparatus capable of changing an emphasized display portion corresponding to a change of a display portion which requires attraction of user's attention among multiple display portions.

According to an aspect of the present disclosure, a display apparatus includes multiple display portions each displaying a content different from one another, a decoration member decorating one of the multiple display portions, an actuator moving the decoration member, and a control portion controlling the actuator to move the decoration member to a position at which the decoration member decorates one display portion selected among the multiple display portions.

The display apparatus configured as above is capable of changing an emphasized display portion corresponding to a change of a display portion which requires attraction of user's attention among multiple display portions of the display apparatus.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Figure 1:
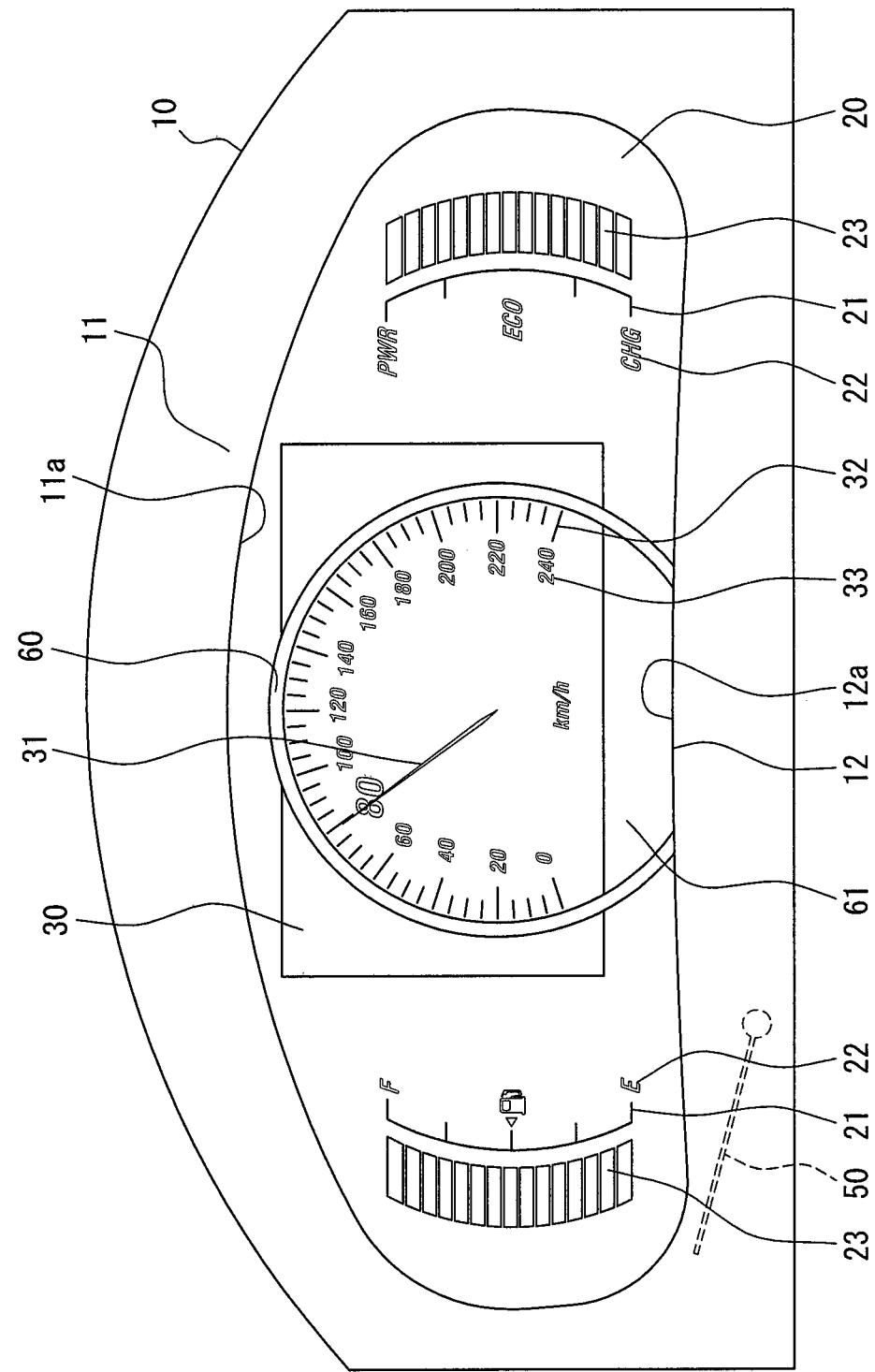
FIG. 1 is a diagram showing a front view of a display apparatus according to one embodiment of the present disclosure in a state where the display apparatus is equipped to an instrument panel of a vehicle.

Hereinafter, embodiments to implement the present disclosure will be described with reference to the drawings. In the respective embodiments below, a portion corresponding to what has been described in any preceding embodiment is labeled with a same reference numeral and may not be described repetitively. Also, in the respective embodiments below, when only a part of a configuration is described, the configuration described in any preceding embodiment may be applied by reference to the rest of the configuration.

A display apparatus shown in FIG. 1 is equipped to an instrument panel provided in a compartment of a vehicle, more specifically, in a portion of the instrument panel located on a vehicle front side with respect to a driver's seat. FIG. 1 omits the instrument panel and shows a visually recognized portion of the display apparatus which is equipped to the instrument panel.

Figure 2:
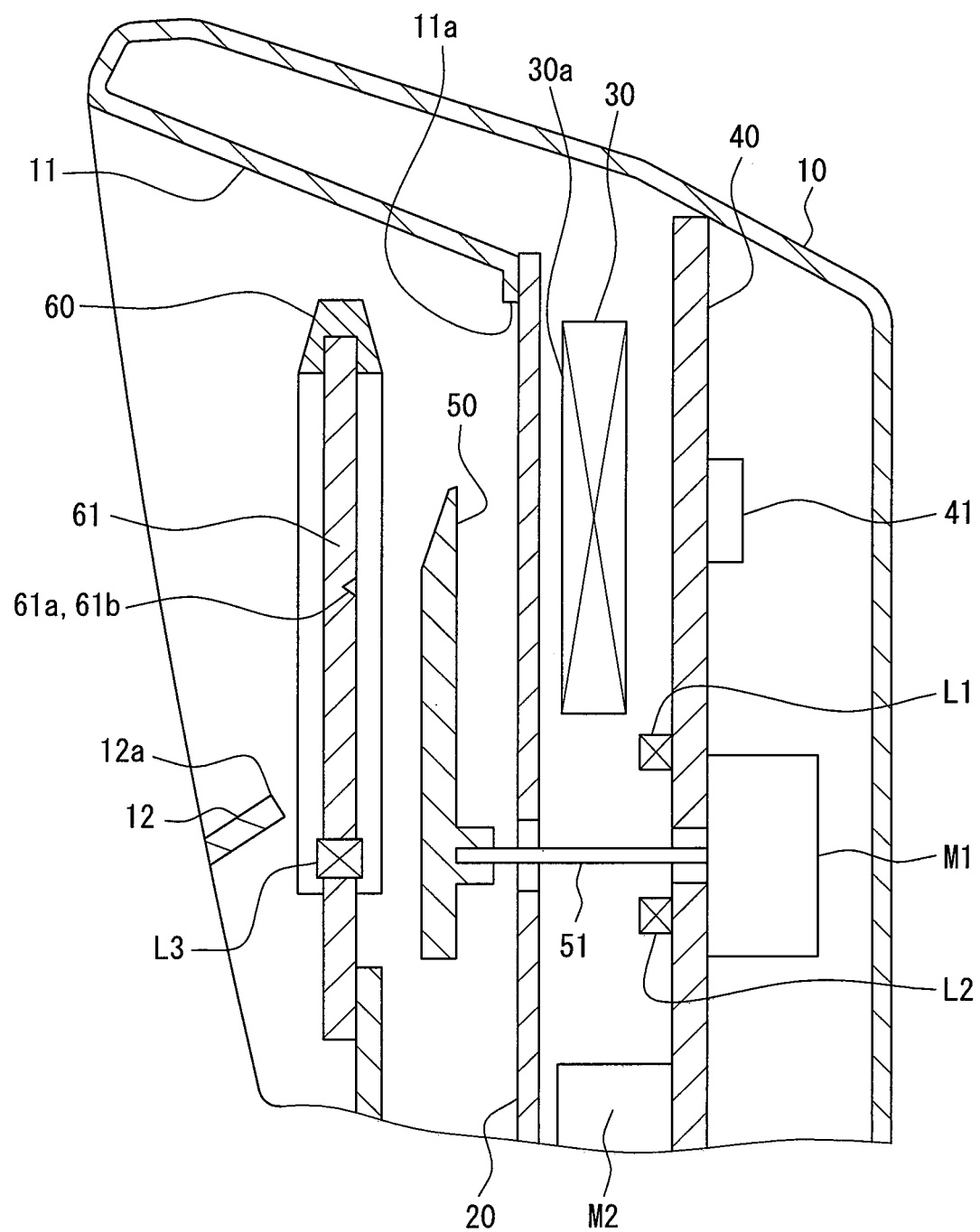
FIG. 2 is a sectional view schematically showing a cross section of the display apparatus shown in FIG. 1.

As shown in FIG. 1 and FIG. 2, the display apparatus includes a case 10, a dial plate 20 (display portion), a liquid crystal display unit 30 (display portion), a circuit board 40, a pointer 50, a decoration ring 60 (decoration member), and so on. The case 10 is made of light-blocking resin. The dial plate 20, the liquid crystal display unit 30, the circuit board 40 and so on are disposed inside of the case 10. A facing plate 11 (upper facing plate) disposed at an upper part of the case 10 and a facing plate 12 (lower facing plate) disposed at a lower part of the case 10, which will be described below, are integrally molded with the case 10 from resin.

The dial plate 20 is made of light-transmitting resin and has a scale display portion 21, a character display portion 22, and a bar display portion 23, all of which are illuminated with transmitted light from a light source L1. Hereinafter, the display portions 21, 22, and 23 are collectively referred to as a dial-plate display portion. Respective portions of the dial plate 20 providing the scale display portion 21, the character display portion 22, and the bar display portion 23 correspond to display portions.

In the dial plate 20, light is transmittable through a portion in which the dial-plate display portion is provided and a portion opposing the liquid crystal display unit 30 transmit light. On the remaining portion of the dial plate 20, a light-blocking coating material is printed. Hence, when the light source L1 is turned ON, the dial-plate display portion is illuminated with transmitted light and is therefore visually recognized. By controlling a lighting range of the light source L1, a visual recognition range of the bar display portion 23 is varied. Consequently, a power meter indicating a remaining amount of in-vehicle battery power and a fuel gauge indicating a remaining amount of fuel are represented on the dial plate 20.

The upper facing plate 11 and the lower facing plate 12 are disposed closer to the user compared with the dial plate 20 (left side on a drawing sheet of FIG. 2) in the visual recognition direction. Of the dial plate 20, a portion located inside of openings 11a and 12a of the facing plates 11 and 12 form a visually recognizable display region. The facing plates 11 and 12 therefore function as a display frame of the dial plate 20.

The liquid crystal display unit 30 includes a back light and a liquid crystal panel, and is disposed on an inner side in the visual recognition direction with respect to the dial plate 20. A display surface 30a of the liquid crystal display unit 30 is located at a center of the display region of the dial plate 20 and the dial-plate display portion is disposed on both of right and left sides of the display surface 30a. When the back light is turned ON, an image displayed on the display surface 30a becomes visually recognized through the dial plate 20.

In a display example shown in FIG. 1, multiple pointer images 31, multiple scale images 32, and multiple numeric character images 33 are displayed on the display surface 30a and the three kinds of images configure a speedometer. In other words, the pointer images 31 are displayed in such a manner that the pointer rotates according to a vehicle speed. The vehicle speed is indicated by the scale image 32 pointed by the pointer image 31.

Figure 5:
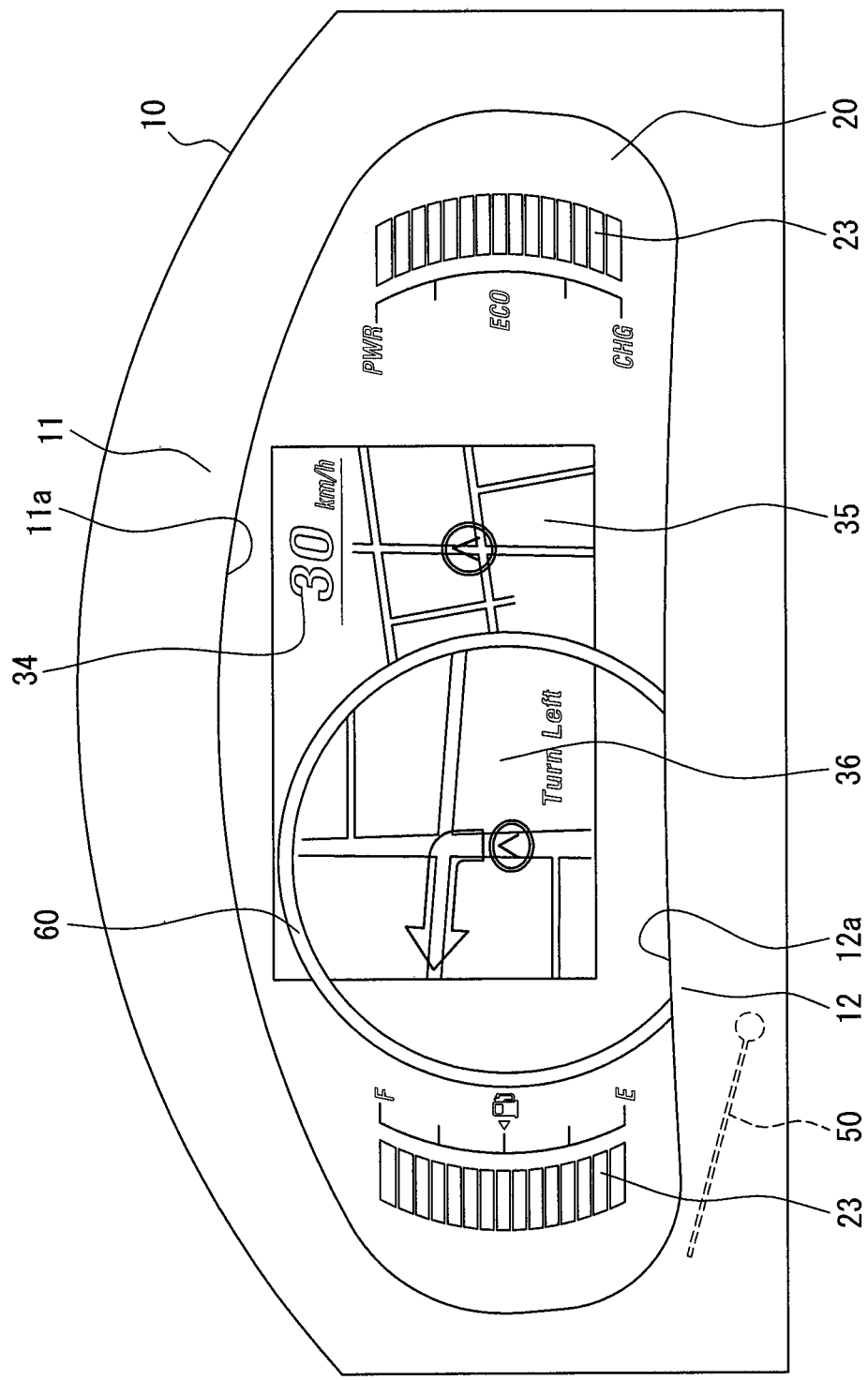
FIG. 5 is a front view showing a display content in a navigation mode displayed by the display apparatus shown in FIG. 1.

In a display example shown in FIG. 5, a vehicle speed image 34 indicating the vehicle speed in a numeric value, a map image 35 indicating a present location of the vehicle, and an enlarged map image 36 displaying guidance as to where in the map 35 the vehicle is supposed to take a right or left turn are displayed on the display surface 30a. The enlarged map image 36 may be displayed constantly or popped up while a distance from a location where the vehicle is currently traveling to a point at which the vehicle is supposed to take a right or left turn is shorter than a predetermined distance. In a display example shown in FIG. 6, the vehicle speed image 34, an oil temperature image 37 indicating a temperature of engine oil, and a supercharging pressure image 38 indicating a supercharging pressure of an internal combustion engine are displayed on the display surface 30a. Respective portions of the liquid crystal display unit 30 displaying the foregoing images correspond to display portions. Hereinafter, the foregoing image display portions are collectively referred to as a liquid crystal display portion. The display portions include multiple types each displaying a different content, such as a display portion displaying a vehicle speed and a display portion displaying an engine speed.

The circuit board 40 is disposed on an inner side in the visual recognition direction with respect to the liquid crystal display unit 30. A microcomputer 41, light sources L1 and L2, and electric motors M1 and M2 are attached to the circuit board 40. The microcomputer 41 has a central processing unit, a memory, and so on, and the microcomputer 41 controls operations of the light sources L1 and L2 and the electric motors M1 and M2 and outputs an image signal to the liquid crystal display unit 30 by executing various types of computation process in accordance with pre-stored programs.

A rotation shaft 51 of the electric motor M1 is attached to the pointer 50. The pointer 50 is disposed closer to the user compared with the dial plate 20 in the visual recognition direction. When the electric motor M1 is driven, the pointer 50 rotates along a surface of the dial plate 20. The pointer 50 is made of light-transmitting resin, and when illuminated by light emitted from the light source L2 and entering inside, the pointer 50 becomes visually recognized as if the pointer 50 emits the light. A rotation range of the pointer 50 includes a visual recognition region, which is located inside the opening 12a of the lower facing plate 12 and is therefore visually recognizable (see FIG. 6), and a retraction region, which is located outside the opening portion 12a and is therefore visually unrecognizable (see FIG. 1 and FIG. 5).

Figure 3:
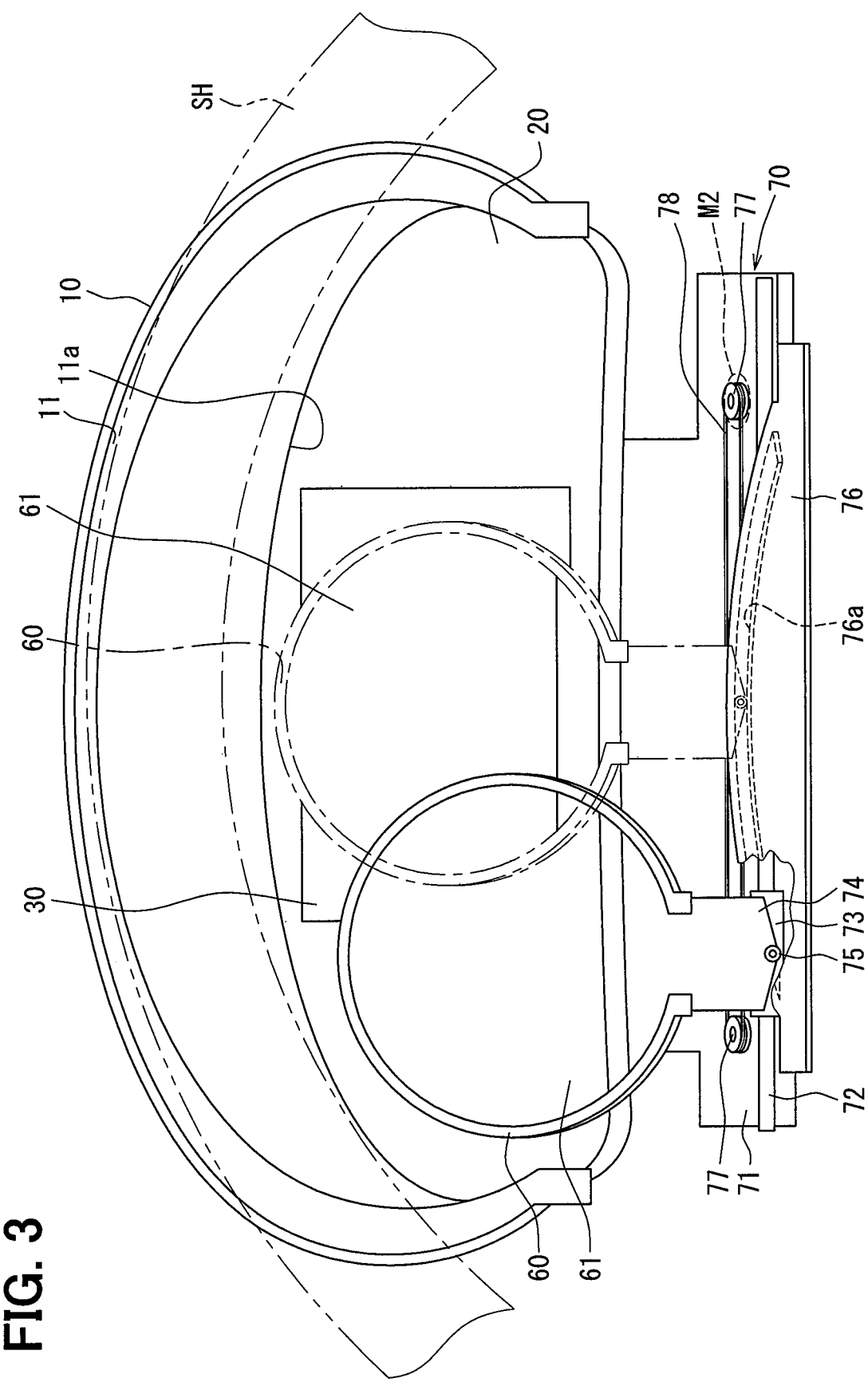
FIG. 3 is a front view showing a state in which the display apparatus shown in FIG. 1 is removed from the instrument panel.
Figure 4:
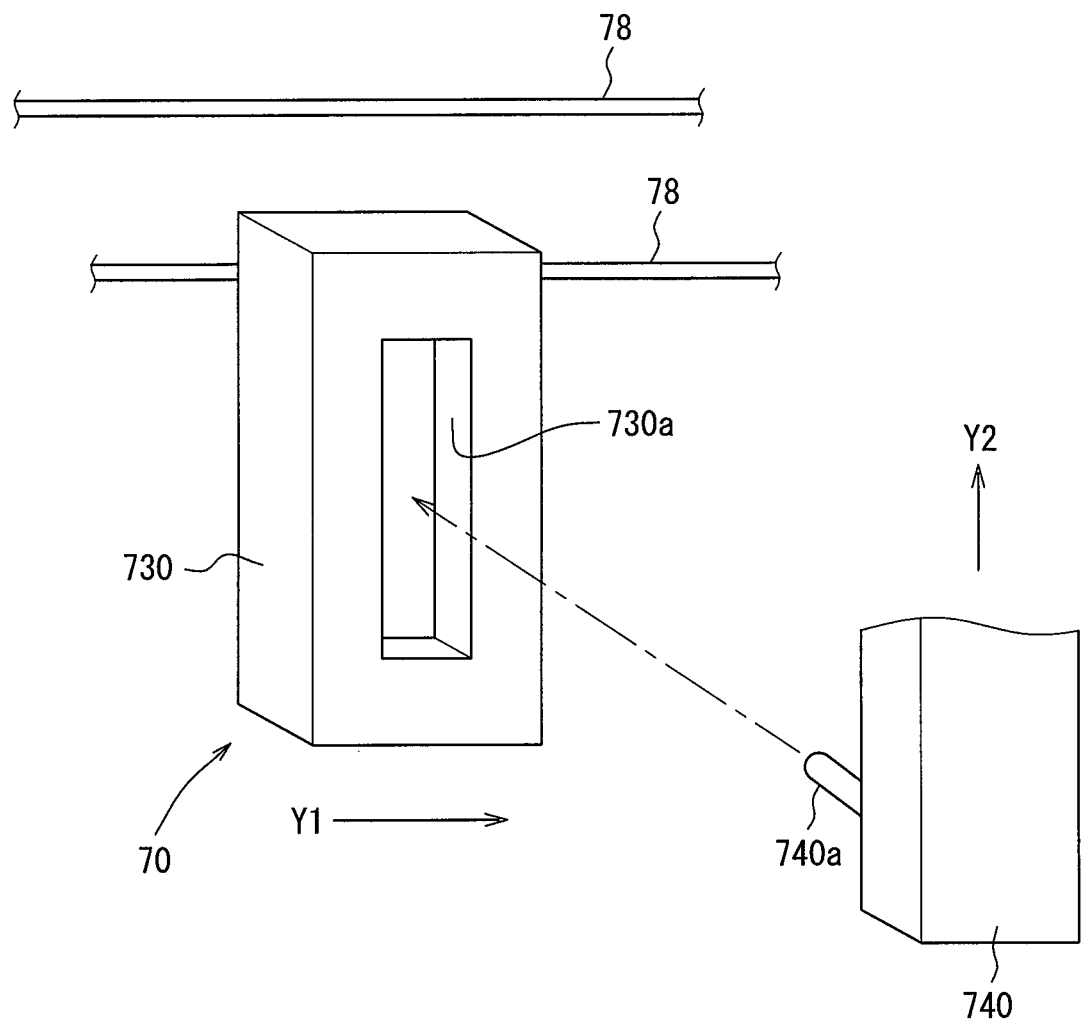
FIG. 4 is an exploded perspective view schematically showing details of a movable device shown in FIG. 3.

The decoration ring 60 is disposed closer to the user compared with the pointer 50 in the visual recognition direction. A display plate 61 is equipped along an inner periphery of the decoration ring 60 and a light source L3 is attached to the display plate 61. The electric motor M2 is an actuator which moves the decoration ring 60 together with the display plate 61 and the light source L3. When the electric motor M2 is driven, a movable mechanism 70 shown in FIG. 3 and FIG. 4 is actuated to move the decoration ring 60. A movement trajectory of the decoration ring 60 is of a shape parallel to the surface of the dial plate 20 and conforming to an arc shaped by a steering wheel SH (see FIG. 3). In short, the decoration ring 60 moves along an inner peripheral edge of the steering wheel SH. It is set in such a manner that the decoration ring 60 moved to any position is entirely exposed from the steering wheel SH and visually recognizable by the user.

The decoration ring 60 is made of light-blocking resin and painted in any suitable color. The display plate 61 is made of light-transmitting resin and groove-shaped refection portions 61a and 61b are provided to a back surface of the display plate 61. Light emitted from the light source L3 enters the display plate 61 from an edge portion. The incident light is guided further until reflected on the reflection portions 61a and 61b and goes out from a surface of the display plate 61. Consequently, the reflection portions 61a and 61b are visually recognized as the reflection portions 61a and 61b emit the light. The reflection portions 61a and 61b are formed in shapes respectively representing a scale and a numeric character pointed by the pointer 50. Of the light entering from the edge portion of the display plate 61, light reflected on an outer peripheral edge of the display plate 61 is blocked by the decoration ring 60 and cannot be visually recognized by the user.

Figure 6:
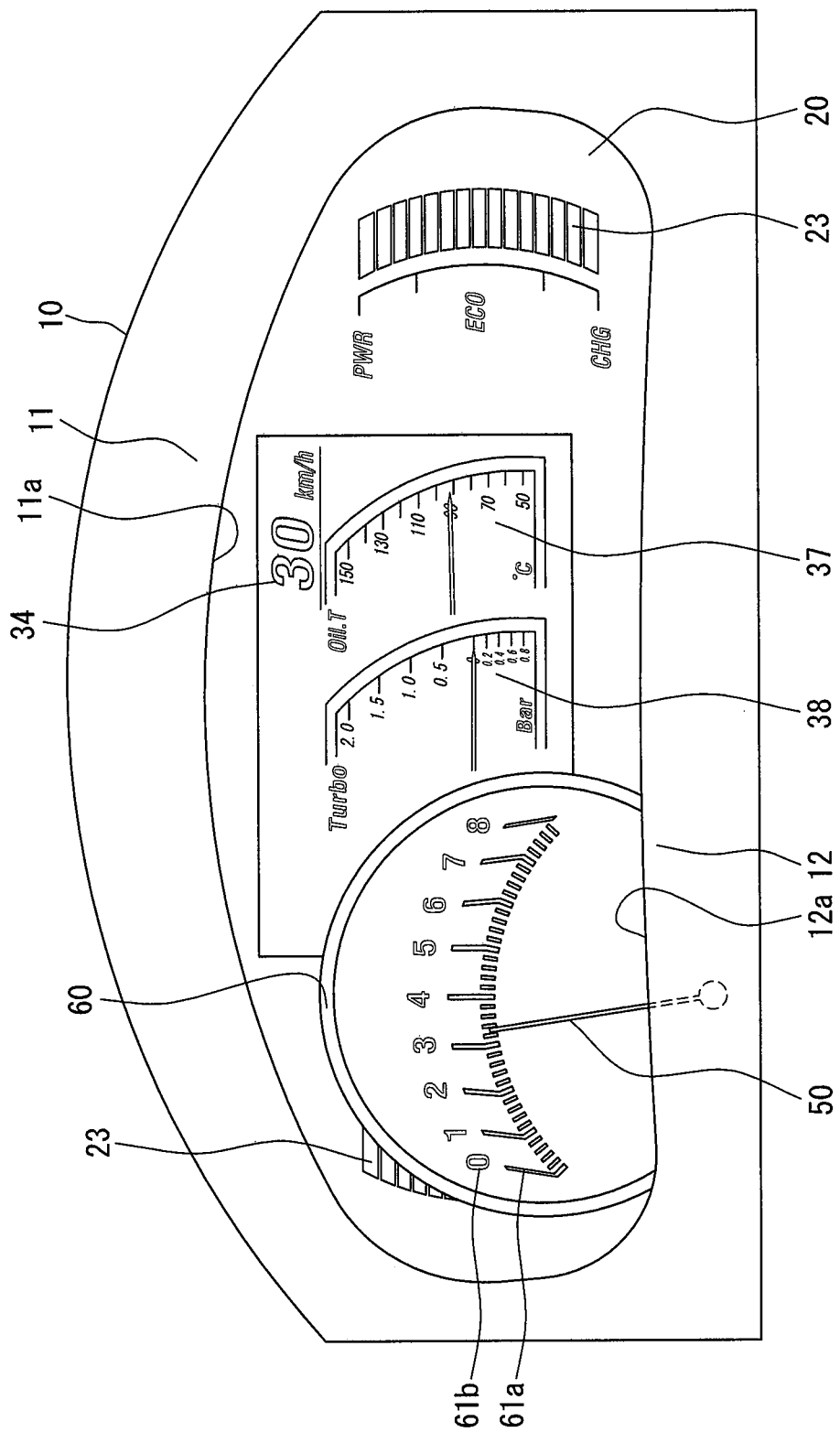
FIG. 6 is a front view showing a display content in a tachometer mode displayed by the display apparatus shown in FIG. 1.

In essence, when the light sources L2 and L3 are turned ON, the scale and the numeric characters are represented, respectively, by the reflection portions 61a and 61b of the display plate 61 which are visually recognizable, and the pointer 50 is also visually recognized through the display plate 61 (see FIG. 6). In an example of FIG. 6, a tachometer indicating a rotation speed of the internal combustion engine is represented by the pointer 50 and the reflection portions 61*a* and 61*b*. The decoration ring 60, which is visually recognizable by the outside light, decorates the tachometer located inside the decoration ring 60. On the other hand, when the light sources L2 and L3 are turned OFF, as shown by the examples in FIG. 1 and FIG. 5, the liquid crystal display unit 30 becomes visually recognizable through the display plate 61.

In the example of FIG. 1, an image of the speedometer which is displayed by the liquid crystal display unit 30 is decorated by being located inside the decoration ring 60. In the example of FIG. 5, the enlarged map image 36 which is displayed by the liquid crystal display unit 30 is decorated by being located inside the decoration ring 60. The pointer 50 and the display plate 61 forming the tachometer correspond to display portions, which are hereinafter collectively referred to as a tachometer display portion.

A structure of the movable mechanism 70 will now be described with reference to FIG. 3 and FIG. 4.

As shown in FIG. 3, the movable mechanism 70 includes a base member 71, a rail 72, a horizontally movable portion 73, a vertically movable portion 74, a roller 75, a roller guide 76, pulleys 77, a belt 78, and so on. The rail 72, the roller guide 76, and a pair of the pulleys 77 are attached to the base member 71. The horizontally movable portion 73 is equipped to the rail 72 in a movable manner along a horizontal direction.

The vertically movable portion 74 is equipped to the horizontally movable portion 73 in a manner that the vertically movable portion 74 is able to move up and down in a vertical direction. The vertically movable portion 74 will be described more in detail using FIG. 4. A guide forming portion 730 which is provided with a vertical guide groove 730*a* extending in the vertical direction is attached to the horizontally movable portion 73. On the other hand, a pin forming portion 740 provided with a pin 740*a* to be inserted into the vertical guide groove 730*a* is attached to the vertically movable portion 74.

The roller 75 is equipped to the vertically movable portion 74 in a rotatable manner and fit into an arc guide groove 76*a* provided to the roller guide 76. The arc guide groove 76*a* has an arc shape protruding in an upper part and parallel to an arc shaped by the steering wheel SH. The vertically movable portion 74 is held by being pinched between the roller guide 76 and the base member 71, and the vertically movable portion 74 is movable along the arc guide groove 76*a*.

The belt 78 is put on a pair of the pulleys 77 and the guide forming portion 730 is fixed to the belt 78. Hence, when the belt 78 together with the pulleys 77 is rotated by driving the electric motor M2, the horizontally movable portion 73 together with the guide forming portion 730 moves in the horizontal direction along the rail 72 (see an arrow Y1 of FIG. 4). The roller 75 is then guided by the arc guide groove 76*a* and the vertically movable portion 74 moves in the vertical direction relatively with respect to the horizontally movable portion 73 (see an arrow Y2 of FIG. 4). In other words, the vertically movable portion 74 moves in an arc along the arc guide groove 76*a* by moving in the horizontal direction with the horizontally movable portion 73 and also moving in the vertical direction relatively with respect to the horizontally movable portion 73. Consequently, the decoration ring 60 and the display plate 61 move in an arc trajectory.

Figure 7:
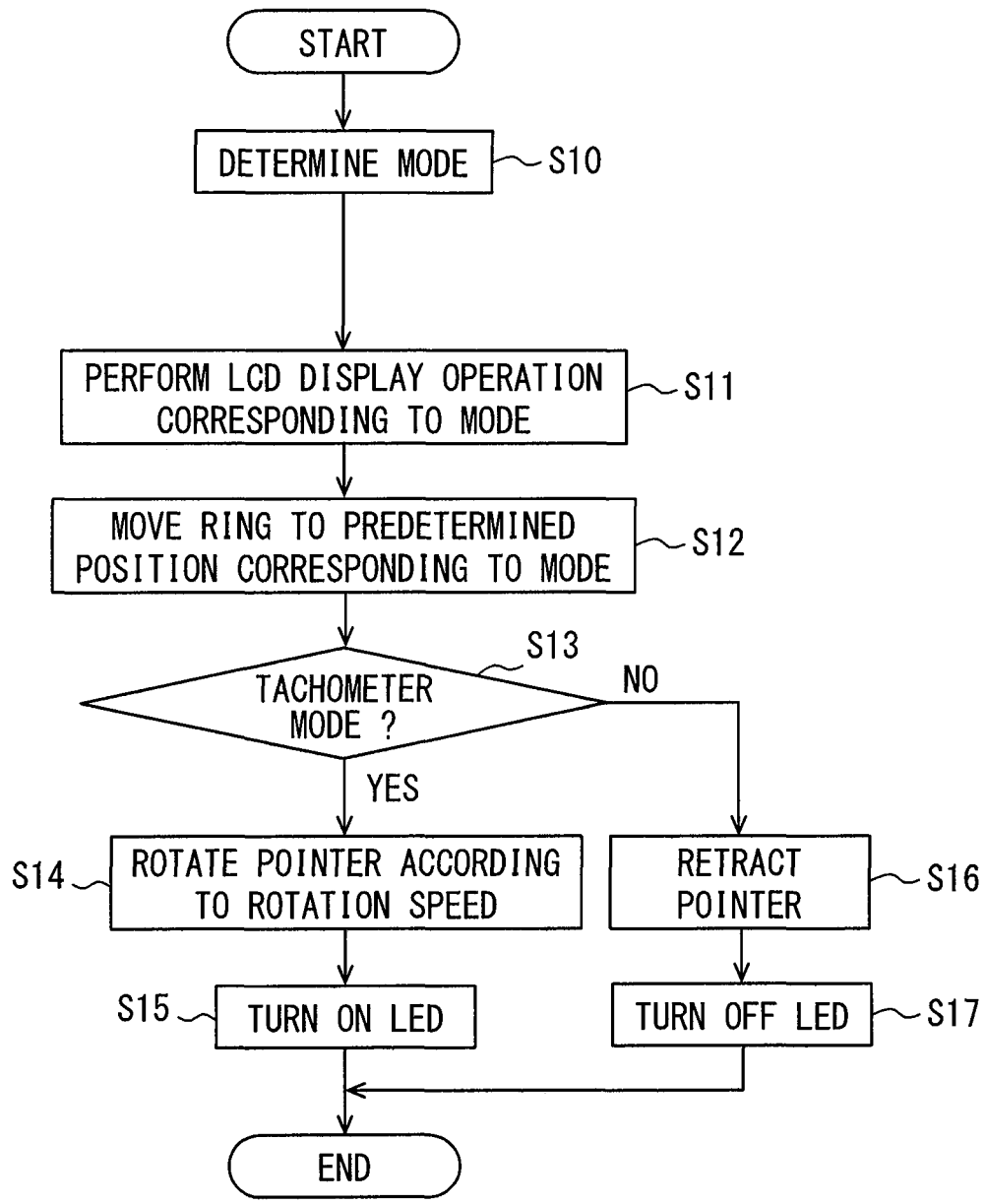
FIG. 7 is a flowchart showing a procedure to control an operation of the display apparatus shown in FIG. 1.

The microcomputer 41 controls operations of the electric motors M1 and M2, the light sources L1, L2, and L3, and the liquid crystal display unit 30 by repetitively performing process shown in FIG. 7 at predetermined cycles. The microcomputer 41 which drives and controls the electric motor M2 corresponds to a control portion.

That is to say, a display mode of the display apparatus is determined first in step S10 of FIG. 7. For example, in a case where a user manually selects one display mode among preset multiple types of display modes, the manually selected display mode is determined to be the display mode. Specific examples of the display modes of multiple types include a navigation mode shown in FIG. 5 in which the map image 35 is displayed, a tachometer mode shown in FIG. 6 in which the tachometer is displayed, and a standard mode shown in FIG. 1 in which the speedometer is displayed. In a case where no display mode is manually selected, the standard mode is determined to be the display mode.

In subsequent step S11, an image signal including a display content corresponding to the display mode determined in step S10 is outputted to the liquid crystal display unit 30. For example, in the case of the standard mode, the pointer image 31, the scale image 32, and the numeric character image 33 are displayed and a display position of the pointer image 31 is rotated according to a vehicle speed. In the case of the navigation mode, the vehicle speed image 34 corresponding to a vehicle speed is displayed and also the map image 35 and the enlarged map image 36 corresponding to a present travel location of the vehicle are displayed. In the case of the tachometer mode, the vehicle speed image 34, the oil temperature image 37, and the supercharging pressure image 38 are displayed.

In subsequent step S12, the electric motor M2 is driven under control to move the decoration ring 60 to a position corresponding to the display mode determined in step S10. For example, in the case of the standard mode, the decoration ring 60 is moved to a position indicated by an alternate long and short dash line of FIG. 3 at which the decoration ring 60 selects the speedometer as a decoration subject and decorates the speedometer. In the case of the tachometer mode, the decoration ring 60 is moved to a position indicated by a solid line in FIG. 3 at which the decoration ring 60 selects the tachometer (tachometer display portion) represented by the pointer 50 and the display plate 61 as a decoration subject and decorates the tachometer.

In the case of the navigation mode, the decoration ring 60 is moved to a position at which the decoration ring 60 decorates the enlarged map image 36. In a case where the enlarged map image 36 is popped up as described above, the decoration ring 60 is moved to a position at which a center position of the map image 35 or a vehicle display position falls on a center of the decoration ring 60 while the enlarged map image 36 is not popped up. The decoration ring 60 is moved to a position at which the decoration ring 60 decorates the enlarged map image 36 as soon as the enlarged map image 36 is popped up.

In essence, a display portion corresponding to the display mode is selected among the respective liquid crystal display portions displayed by the liquid crystal display unit 30 and the tachometer display portion made up of the pointer 50 and the display plate 61. The decoration ring 60 is moved to a position at which the decoration ring 60 decorates the selected display portion.

In subsequent step S13, a determination is made to determine whether the determined display mode is the mode (tachometer mode) in which the pointer 50 is decorated. When the determined display mode is the tachometer mode, the electric motor M1 is driven under control to rotate the pointer 50 to a position corresponding to the engine speed.

In subsequent step S15, the pointer 50 is illuminated by turning on the light source L2 and the scale and the numeric characters becomes recognizable by, respectively, illuminating the reflection portions 61a and 61b. The reflection portions 61a and 61b are illuminated by turning on the light source L3.

On the other hand, when it is determined in step S13 that the determined display mode is not the tachometer mode, the electric motor M1 is driven under control to make the pointer 50 retract to the retraction region to be visually unrecognizable. In subsequent step S17, the light sources L2 and L3 are turned off to make the liquid crystal display unit 30 and the dial plate 20 visually recognizable through the display plate 61.

A desirable attention-attracting display portion changes from one display mode to another. For example, it is desirable to attract attention to the speedometer in the standard mode, the enlarged map image 36 in the navigation mode, and the tachometer in the tachometer mode. In the present embodiment, such a change of a desirable attention-attracting display portion is taken into consideration and the decoration ring 60 is moved to a position that best suits the display mode. Hence, the present embodiment is capable of dealing with a change of a desirable attention-attracting display portion.

For example, in the navigation mode, since the enlarged map image 36 is decorated, attention is attracted on the map image 36 among the vehicle speed image 34, the map image 35, and the enlarged map image 36 on the dial-plate display portion. Also, for example, in the tachometer mode, since the tachometer is decorated, attention is attracted on the tachometer among the vehicle speed image 34, the oil temperature image 37, the supercharging pressure image 38, and the tachometer of the dial-plate display portion. Further, for another example, in the standard mode, since the speedometer is decorated, attention is attracted on the speedometer among the dial-plate display portion and the liquid crystal display portion (speedometer).

As described above, when a desirable attention-attracting display portion changes among the multiple display portions, the display apparatus is capable of moving the decoration member to a position at which the decoration member selects the changed display portion and decorates the selected display portion. Hence, for example, in a case where the speedometer and the tachometer are displayed together at a time as the display portions, when attention needs to be desirably attracted on the speedometer, the speedometer is selected and decorated by the decoration member. When a desirable attention-attracting display portion changes from the speedometer to the tachometer, the decoration member moves so as to select and decorate the tachometer. In the manner as described above, the display apparatus is capable of dealing with a change of a desirable attention-attracting display portion.

In the present embodiment, the display apparatus is disposed on the vehicle front side with respect to the steering wheel SH and the decoration ring 60 is provided to be movable along an arc shaped by the steering wheel SH. Hence, when a driver operating the steering wheel SH views the display apparatus, the decoration ring 60 can be always recognizable by the driver without being blocked by the steering wheel SH. In addition, since the decoration ring 60 is provided to be movable along an arc shaped by the steering wheel SH, a larger movable range can be secured for the decoration ring 60. Consequently, the display portions in a larger range can be decorated by the decoration ring 60.

In the present embodiment, the display apparatus includes the light-transmitting display plate 61 having the reflection portions 61a and 61b which become visually recognizable in predetermined shapes by reflecting light emitted from the light source L3. The display plate 61 is disposed closer to the user compared with the liquid crystal display portion in the visual recognition direction. The display apparatus also includes a light source control portion (steps S15 and S17) which switches display modes between a reflection portion display mode and a reflection portion hidden mode. In the reflection portion display mode, the decoration ring 60 decorates the reflection portions 61a and 61b which becomes visually recognizable in response to a turning on of the light source L3. In the reflection portion hidden mode, the decoration ring 60 decorates the liquid crystal display portion which is becomes visually recognizable through the display plate 61 in response to a turning off of the light source L3.

According to the configuration as above, when the reflection portion hidden mode is switched to the reflection portion display mode, the reflection portions 61a and 61b are visually recognized as each appears at a position closer to the user compared with the liquid crystal display portion. Hence, attention-attracting performance for the reflection portions 61a and 61b can be enhanced. Moreover, the reflection portions 61a and 61b appearing in the manner as above are decorated with the decoration ring 60. Hence, the attention-attracting performance for the reflection portions 61a and 61b appeared as above can be further enhanced.

In the present embodiment, the electric motor M2 moves display plate 61 with the decoration ring 60. Hence, a spaced distance between the decoration ring 60 and the display plate 61 in the visual recognition direction can be reduced. Alternatively, the decoration ring 60 and the display plate 61 may be mounted to a same position in the visual recognition direction. In either case, the display apparatus can have a compact size in the visual recognition direction.

In the present embodiment, the display apparatus includes the lower facing plate 12 disposed closer to the user compared with the decoration ring 60 and the liquid crystal display portion in the visual recognition direction. The lower facing plate 12 functions as the display frame to define the display region. It is configured in such a manner that an area of a portion of the decoration ring 60 covered by the lower facing plate 12 varies as the decoration ring 60 moves. Such a configuration provides an illusion as if the decoration ring 60 changes in shape as the decoration ring 60 moves. Consequently, more attention is drawn to the decoration ring 60 and hence the attention-attracting performance can be enhanced.

OTHER EMBODIMENTS

The above has described the preferred embodiment of the present disclosure. It should be appreciated, however, that the present disclosure is not limited to the embodiment described above and can be modified in various manners, and example of modifications will be described below. Besides portions of the respective embodiments combined as explicitly described herein, the embodiments can be combined partially even when such a combination is not described explicitly unless a trouble arises from the combination.

Attention may be attracted to the fuel gauge by moving the decoration ring 60 to a position at which the decoration ring 60 decorates the fuel gauge when a remaining amount of fuel indicated by the fuel gauge on the dial-plate display portion decreases to a predetermined amount. Alternatively, attention may be attracted to the power meter by moving the decoration ring 60 to a position at which the decoration ring 60 decorates the power meter when a remaining amount of battery power indicated by the power meter on the dial-plate display portion decreases to a predetermined amount. Further, attention may be attracted to a warning display portion by moving the decoration ring 60 to a position at which the decoration ring 60 decorates the warning display portion when a warning is displayed in the event of abnormality.

In the embodiment described above, the liquid crystal display portion displayed by the liquid crystal display unit 30 and the tachometer display portion made up of the pointer 50 and the display plate 61 are described as the display portions to be decorated by the decoration ring 60. Alternatively, the dial-plate display portion, such as the scale display portion 21, the character display portion 22, and the bar display portion 23, displayed on the dial plate 20 may be used as the display portions to be decorated by the decoration ring 60.

For example, it may be configured in such a manner that a display portion to be decorated is selected among the liquid crystal display portion, the tachometer display portion, and the dial-plate display portion, and then, the selected display portion may be decorated by the decoration ring 60. Alternatively, a display portion to be decorated may be selected among multiple dial-plate display portions, and then, the selected display portion may be decorated by the decoration ring 60. A display portion to be decorated may be selected among multiple liquid crystal display portions, and then, the selected display portion may be decorated by the decoration ring 60. In such a case, the display plate 61 disposed inside the decoration ring 60 may be omitted.

The embodiment described above adopts a structure that moves the display plate 61 with the decoration ring 60. Alternatively, a structure in which the display plate 61 is fixed may be adopted instead. In such a structure, the decoration ring 60 and the display plate 61 have to be disposed at different positions in the visual recognition direction.

In the embodiment described above, the decoration ring 60 shaped like a ring is used as the decoration member decorating the liquid crystal display portion or the dial-plate display portion. It should be noticed that the decoration member is not limited to a ring-like member in the present disclosure. For example, the decoration member may be shaped like an arc to partially extend along a periphery of the display portions.

In the embodiment shown in FIG. 7, when the display modes are switched, the decoration ring 60 is moved after an image displayed by the liquid crystal display unit 30 is changed to a content corresponding to the switched display mode. Alternatively, the attention-attracting performance may be enhanced by moving the decoration ring 60 first and then changing the image to a content corresponding to the switched display mode.

A notification sound may be generated when the decoration ring 60 is moved to let the user notice that the decoration ring 60 is moving. The notification sound may be generated immediately before or after the decoration ring 60 starts moving or while the decoration ring 60 is moving.

In the embodiment described above, the movable range of the decoration ring 60 is set to a range including the display surface 30*a* of the liquid crystal display unit 30, that is, a range larger than the display surface 30*a*. Alternatively, the movable range of the decoration ring 60 may be set not to extend beyond the range of the display surface 30*a*.

In the embodiment described above, the decoration ring 60 is set to be movable along a predetermined arc. The present disclosure is not limited to the configuration as above. For example, the decoration ring 60 may be set to be movable along a predetermined straight line or to be movable two-dimensionally within a predetermined planar range.

In the embodiment described above, when the display modes are switched, the decoration ring 60 is moved to a position that best suits the switched display mode. Alternatively, when a display content is changed in the same display mode, the decoration ring 60 may be also moved to a position that best suits the changed display content. For example, in the case of the navigation mode, it may be configured in such a manner that the enlarged map image 36 is decorated while the enlarged map image 36 is popped up whereas the map image 35 is decorated while the enlarged map image 36 is not displayed. Also, for example, in the case of the standard mode, the fuel gauge may be decorated when a remaining amount of fuel indicated by the fuel gauge decreases to a level less than the predetermined amount.

In the embodiment described above, the decoration ring 60 is illuminated by the environment light from the outside of the display apparatus (outside light). Alternatively, a light source to illuminate the decoration ring 60 may be provided and it is preferable to move the light source with the decoration ring 60. In such a case, a color of light to illuminate the decoration ring 60 may be changed. Further, a state of the light source may be switched among turn ON, flash, and turn OFF. Further, a flashing cycle of the light source may be changed. For example, when the speedometer is decorated in the standard mode, it is preferable to enhance attention-attracting performance when the vehicle speed is as high as or higher than a predetermined value by changing a color of the light source of the decoration ring 60 from blue to red or by flashing the light source that has been turned ON.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A display apparatus configured to display a display portion that includes at least a liquid crystal display portion that displays information on a display portion, the display apparatus comprising:
    a liquid crystal display unit having a plurality of display modes, and configured to display the liquid crystal display portion;
    a display plate through which light is transmittable, wherein the display plate includes a reflection portion that becomes visually recognizable in a predetermined shape by reflecting light emitted from a light source, and the display plate is disposed closer to a user compared with the display portion in a visual recognition direction; and
    a light-source control portion configured to switch a display mode of the display plate between a reflection portion display mode and a reflection portion hidden mode according to the selected display mode of the liquid crystal display unit, wherein, in the reflection portion display mode, the reflection portion becomes visually recognizable in response to a turn-on of the light source, and in the reflection portion hidden mode, the display portion becomes visually recognizable through the display plate in response to a turn-off of the light source.

2. The display apparatus according to claim 1, wherein the reflection portion has a groove shape and is provided to a back surface of the display plate,
the light emitted from the light source enters the display plate, reflects on the reflection portion, and goes out from a front surface of the display plate, and
the front surface of the display plate is disposed closer to the user compared with the back surface of the display plate.

3. The display apparatus according to claim 2, wherein the display portion is provided by an image display portion that displays an image.

4. The display apparatus according to claim 1, wherein in the reflection portion hidden mode, the whole display plate is transmittable in response to the turn-off of the light source and the display portion becomes visually recognizable through the display plate.

5. A display apparatus comprising:
a display portion provided as vehicle information, the display portion includes at least a liquid crystal display portion provided by a liquid crystal display unit, and the liquid crystal display unit has a plurality of display modes to be selected;
a light source;
a display plate through which light is transmittable, wherein the display plate includes a reflection portion that becomes visually recognizable in a predetermined shape by reflecting light emitted from the light source, and the display plate is disposed closer to a user compared with the display portion in a visual recognition direction; and
a light-source control portion configured to switch a display mode of the display plate between a reflection portion display mode and a reflection portion hidden mode according to the selected display mode of the liquid crystal display unit, wherein, in the reflection portion display mode, the reflection portion becomes visually recognizable in response to a turn-on of the light source, and in the reflection portion hidden mode, the display portion becomes visually recognizable through the display plate in response to a turn-off of the light source.

6. The display apparatus according to claim 5, further comprising
a display target determination portion configured to select one of a plurality of display targets that are different from each other, and display the display portion provided as the vehicle information related to the display target that is selected,
wherein
the light-source control portion switches the display mode between the reflection portion display mode and the reflection portion hidden mode based on the vehicle information related to the display target.

7. The display apparatus according to claim 6, wherein the display portion is provided by an image display portion that displays an image.

8. The display apparatus according to claim 5, wherein the reflection portion has a groove shape and is provided to a back surface of the display plate,
the light emitted from the light source enters the display plate, reflects on the reflection portion, and goes out from a front surface of the display plate, and
the front surface of the display plate is disposed closer to the user compared with the back surface of the display plate.

9. The display apparatus according to claim 5, wherein one of the plurality of display modes includes a display mode in which a speedometer is displayed as the display portion, and
when the display mode displaying the speedometer is selected, the light-source control portion switches the display mode of the display plate to the reflection portion hidden mode.

10. The display apparatus according to claim 5, wherein, in the reflection portion hidden mode, the whole display plate is transmittable in response to the turn-off of the light source and the display portion becomes visually recognizable through the display plate.

11. A display apparatus comprising:
a dial plate having a first surface configured to display a display portion and a second surface opposite to the first surface;
a liquid crystal display unit disposed close to the second surface of the dial plate, having a plurality of display modes, and configured to display, as the display portion, a liquid crystal display portion, which differs in each selected display mode;
a display plate disposed close to the first surface of the dial plate, and including a reflection portion that becomes visually recognizable in a predetermined shape by reflecting light emitted from a light source; and
a light-source control portion configured to switch a display mode of the display plate between a reflection portion display mode and a reflection portion hidden mode according to the selected display mode of the liquid crystal display unit, wherein:
in the reflection portion display mode, the reflection portion becomes visually recognizable in response to a turn-on of the light source; and
in the reflection portion hidden mode, the reflection portion is hidden in response to a turn-off of the light source, and the display portion is shown through the display plate.

* * * * *